United States Patent
Frey

[11] 3,761,706
[45] Sept. 25, 1973

[54] INDICATING SYSTEM FOR INCANDESCENT LAMPS FOR VEHICLES

[75] Inventor: Egon Frey, Stuttgart, Germany

[73] Assignee: Daimler-Benz Aktiengesellschaft, Stuttgart-Unterturkheim, Germany

[22] Filed: June 29, 1971

[21] Appl. No.: 157,830

[30] Foreign Application Priority Data
June 30, 1970 Germany .................. G 70 24 412.1

[52] U.S. Cl. ............................................. 240/8.41
[51] Int. Cl. ............................................. B60q 9/00
[58] Field of Search .................. 240/8.41, 7.35, 8.2, 240/2 M, 8.1 R, 8.1 A, 8.24, 8.16

[56] References Cited
UNITED STATES PATENTS
3,423,581  1/1969  Baer .................................. 240/8.16
2,245,755  6/1941  Carpenter ......................... 240/8.1 R
3,278,739  10/1966  Royka et al. ............................. 240/2
2,198,443  4/1940  Paul et al. ........................... 240/8.41

Primary Examiner—Richard C. Queisser
Assistant Examiner—Denis E. Corr
Attorney—Craig, Antonelli and Hill

[57] ABSTRACT

An installation for the control of incandescent light bulbs of vehicles, especially of the brake and tail lights of motor vehicles by means of fiber-optical light conductors, whereby one light conductor each is arranged on each vehicle side which adjoins with one end a light source and extends with its other end to the light window of the associated side of a rear ceiling light arranged above the rear window of the vehicle.

5 Claims, 1 Drawing Figure

PATENTED SEP 25 1973 3,761,706
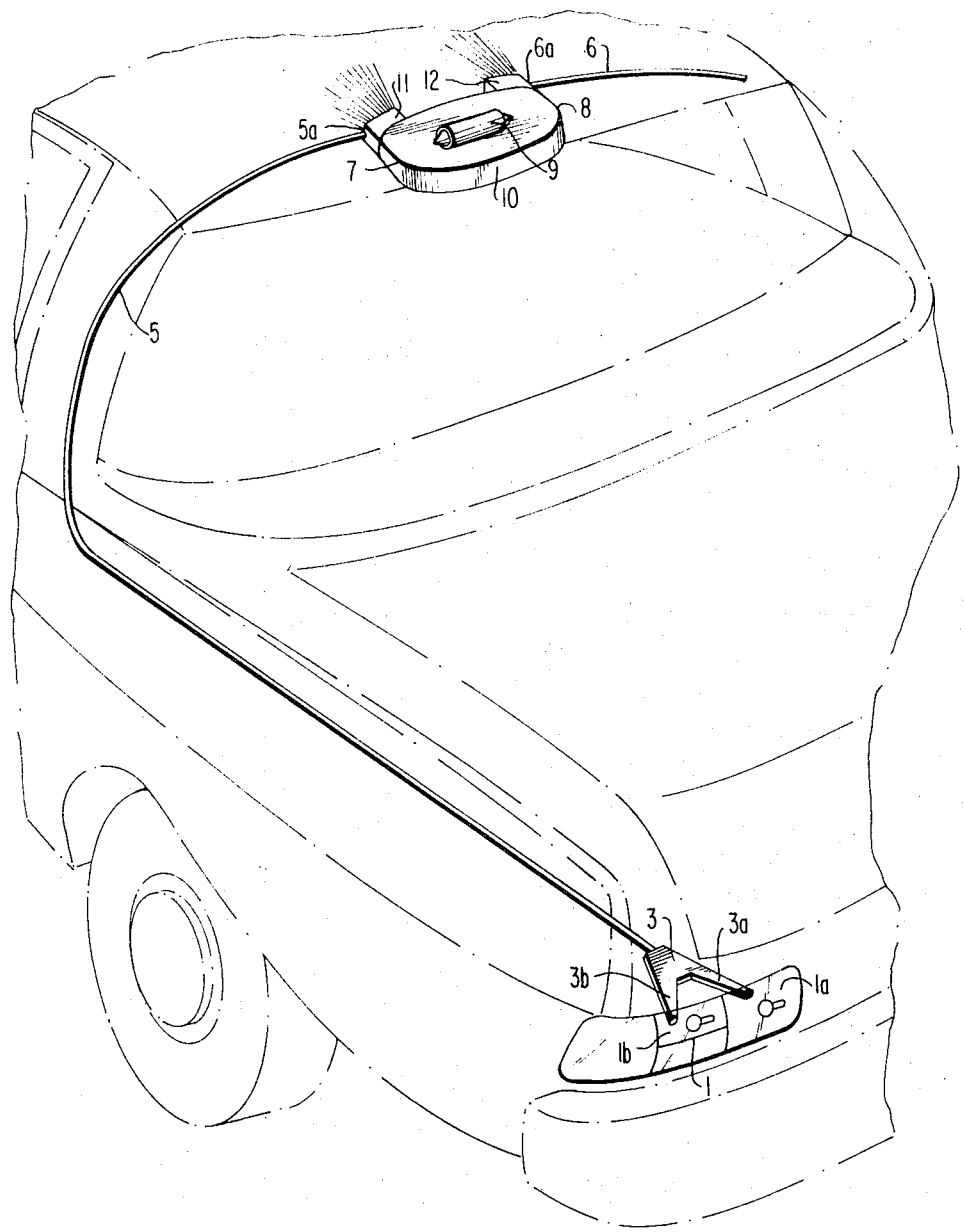
INVENTOR
EGON FREY
BY Craig, Antonelli & Hill
ATTORNEYS

INDICATING SYSTEM FOR INCANDESCENT LAMPS FOR VEHICLES

The present invention relates to an installation for the monitoring of electrically energized incandescent bulbs of vehicles, especially of the brake and tail lights of motor vehicles, by means of fiber-optical light conductors in order to give notice to the driver of the proper light emission of the incandescent lamps or of the failure of such a lamp.

The known indications by means of fiber-optical light conductors are mounted at the instrument panel, i.e., within the field of vision of the driver. It requires special instruction and attention of the driver in order that these indicators are differentiated from others. In addition to the numerous other warning and indicator lights necessary for the completely satisfactory driving operation, they are oftentimes confusing, especially when driving at night. Other known indicator lights arranged approximately at the height of the hat storage place may become incapable of being noticed by the driver due to passengers in the vehicle or due to projecting luggage pieces or by displacement thereof and therefore fail in their basic purpose.

The requirement for an unequivocal light indication, incapable of being covered, for the monitoring of the rear lights, for example, of the beake light and tail light, not visible otherwise to the driver, is fulfilled by the present invention separately for each side. The installation according to the present invention with the use of fiber-optical light conductors essentially consists in that one light conductor each is arranged on each vehicle side and in that its one end is mounted near or placed adjacent at least one light source while the other end of the light conductor leads to a light window on the associated side of a rear-ceiling light above the rear window of the vehicle.

In this manner, the driver can assure himself by a quick glance into the rear view mirror from the actual lighting up, for example, of the brake light during the braking operation initiated by depressing the brake pedal. Advantageously, the light windows are arranged at the sides of the rear ceiling light which are farthest removed from one another.

The arrangement of a light switch in front of one of the light sources, for example, of the brake light, offers the further advantage that—independently of the brake light—additionally the actual lighting up of the turned-on tail light can be examined by the driver without any further difficulties. The differing brightness relative to the brake light supplies a sufficient differentiation feature in addition to the possible arrangement of differing colors by differently colored incandescent lamps or end faces of the light conductor branches.

A considerable advantage of the arrangement according to the present invention is the indication at the rear ceiling lights which cannot be covered off either by vehicle passengers or luggage pieces or be blocked off otherwise, and which leaves completely free the view on the other optical indications for the driving operation or completely separates the same from these other optical indications and therefore cannot be confused.

Accordingly, it is an object of the present invention to provide an indicating system for incandescent lamps of vehicles, especially for motor vehicles, which avoids by simple means the aforementioned shortcomings and drawbacks encountered in the prior art.

Another object of the present invention resides in an indicating installation for the incandescent lamps of motor vehicle rear lights which can be monitored in a simple manner without special instructions or concentrated attention on the part of the driver.

A further object of the present invention resides in an indicating installation for incandescent lamps of vehicles, especially of motor vehicles, which assures a completely satisfactory indication to the driver, not susceptible to being blocked off by other passengers of the vehicle or luggage pieces or other objects.

A still further object of the present invention resides in a light indicating system for monitoring the proper operation of incandescent light bulbs in motor vehicles which is not only simple in construction but also avoids any confusion or mix-up with other light indicating or warning devices.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic perspective view of a rear part of a motor vehicle with a light indicating installation in accordance with the present invention.

Referring now to the single FIGURE of the drawing in which all non-essential details of a motor vehicle rear section are omitted for the sake of simplicity, a three-partite tail light 1 of the left vehicle side of a motor vehicle is indicated in this figure. The part 1a of each tail light 1, shown as rectangle, which is closest to the vehicle center, is to represent the tail light whereas the two outer parts 1b of each tail light serve as brake lights.

One branch 3a and 3b of a conventional light switch 3 is directed to each of the two rectangular parts 1a and 1b; the light switch 3 is arranged at a slight distance in front of the tail lights, i.e., the tail light 1a and the brake light 1b, combined for the most part into a single light unit.

The light switch 3 of any conventional, known construction is disposed at the rear end of a fiber optical light conductor 5 and 6. The forward ends of each light conductor 5 and 6 lead to a rear ceiling light 9 constructed of narrow, rectangular shape which is arranged above the rear window, appropriately over the center thereof. The light conductors 5 and 6 terminate at a respective side of rear ceiling light 9.

The light conductors 5 and 6 terminate at the light screen 10 of the rear ceiling light 9 approximately at the respective lateral edge of the light screen 10 in a forwardly directed light window 11 and 12, respectively. The light window 11 or 12 consists of an approximately rectangularly shaped plexiglass part, to which is attached the forward end 5a or 6a of the light conductor 5 or 6, respectively.

During every lighting up of the brake light or of the tail light on each vehicle side, the light is conducted or transmitted by way of the respective individual light conductor 5 or 6 to the corresponding window 11 or 12 and radiates from the window 11 or 12 into the vehicle interior in a forward direction. As a result thereof, the driver receives notice of the completely satisfactory lighting-up or extinction of these lights, either directly by turning his head, especially during the day, or by a glance into the rear-view mirror (not shown).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. In a motor vehicle having an interior rearview mirror, a plurality of lights, including outside lights mounted outside of the vehicle for at least one of illumination and indication of vehicle operations and an interior rear ceiling light having a light window directed substantially toward the front of the vehicle and viewable in the normally adjusted rearview mirror, an installation for the monitoring of said outside vehicle lights comprising at least one fiber optical light conductor having one end thereof placed in close proximity to at least one of said outside lights and the other end thereof extending to said light window of said interior rear ceiling light so that indications of the operation of said one outside light are visible to the driver of the vehicle in said rearview mirror.

2. The combination defined in claim 1 wherein two light conductors are provided having one end thereof in close proximity to respective outside lights and the other end thereof extending to separated portions of said light window disposed, respectively on each side of said rear ceiling light.

3. The combination defined in claim 2 wherein said rear ceiling light is arranged inside the vehicle above the rear window.

4. The combination defined in claim 2 wherein the outside lights associated with said light conductors serve as brake lights and tail lights.

5. The combination defined in claim 2 wherein each light conductor includes a light switch disposed adjacent a pair of the outside lights.

* * * * *